Jan. 5, 1926.
H. E. WARREN
DEMAND RECORDER
Filed March 21, 1924
1,568,703
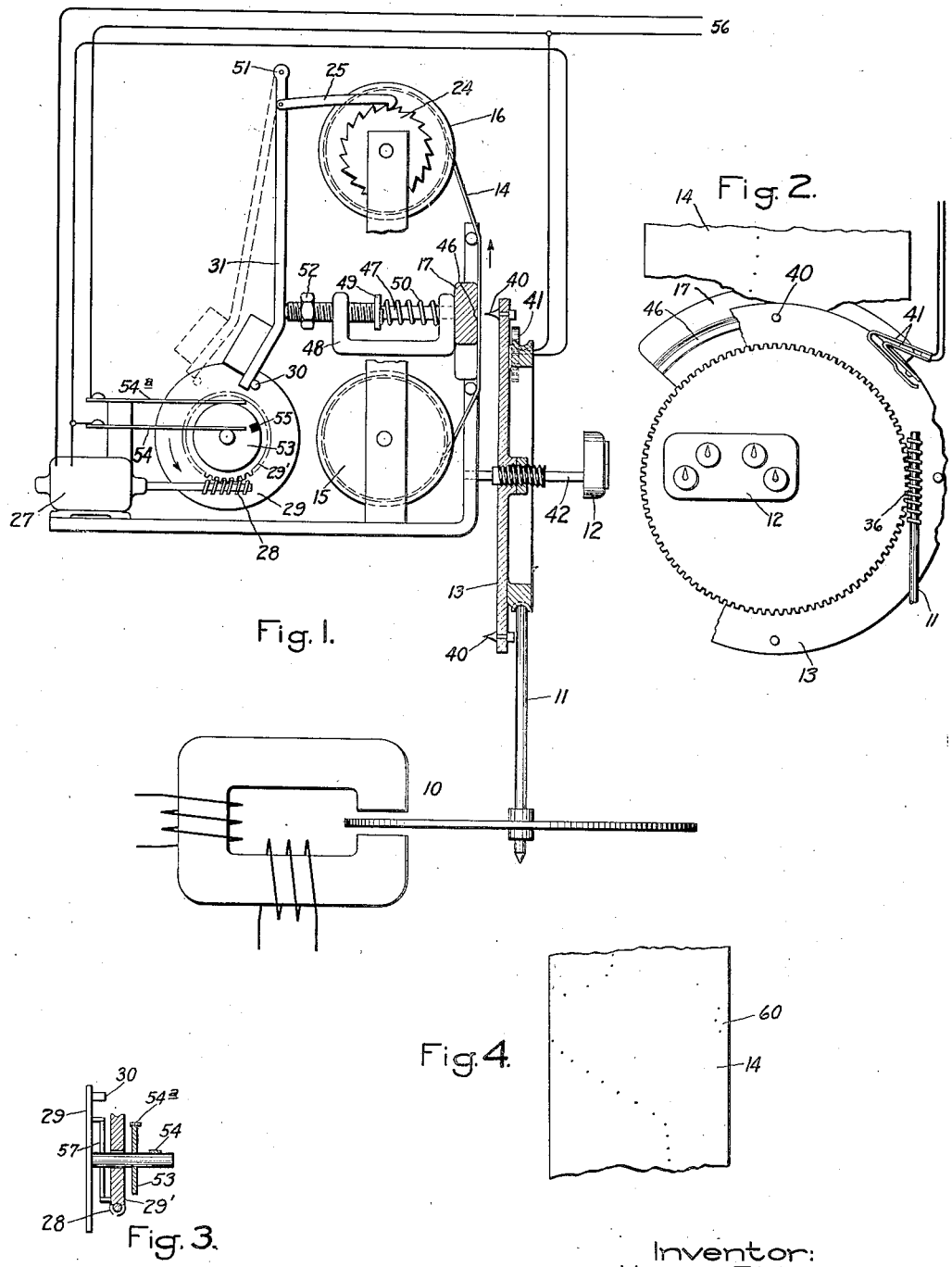
Inventor:
Henry E. Warren,
by
His Attorney.

Patented Jan. 5, 1926.

1,568,703

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

DEMAND RECORDER.

Application filed March 21, 1924. Serial No. 700,947.

*To all whom it may concern:*

Be it known that I, HENRY E. WARREN, a citizen of the United States, residing at Ashland, in the county of Middlesex, State of Massachusetts, have invented certain new and useful Improvements in Demand Recorders, of which the following is a specification.

My invention relates to graphic demand recorders and the object of my invention is to provide a simple, inexpensive, yet highly reliable, apparatus of this class.

In my copending application, Serial No. 527,011, filed January 4, 1922, entitled "Graphic integrating recorders," assigned to the same assignee as the present invention, there is described a frequency integrating and recording instrument. The present invention embodies certain features described in the application above referred to; but which are arranged to produce a measurement and record of integrated demand. In carrying my invention into effect I provide a recording device, which is arranged to be driven in a continuous path at a speed proportional to that of the meter or other device, the demand of which is to be recorded. Preferably the recording device is driven directly by such meter. A record sheet is arranged to be moved along in any suitable manner adjacent to and across the path of movement of the recording device and at predetermined intervals the record sheet and recording device are brought into contact to make a record. The recording device is provided with styli or other marking means which are adapted to be thus moved across the face of the record sheet and normally out of contact therewith. At the beginning of each time interval a stylus is arranged to be in a predetermined position with respect to the record sheet, for example, at one edge, so that at the end of the time interval when the sheet and marking device are brought into contact with each other to make a record the distance of the mark from the starting point is a measure of the demand over the interval. Before the next recording period the sheet is moved along a small distance so that the record obtained is a dotted line curve of integrated demand over equal time intervals.

The features of my invention which I believe to be novel and patentable will be pointed out in the claims appended hereto. For a better understanding of my invention reference is made in the following description to the accompanying drawing, wherein Fig. 1 shows a side view, partially in section, of a preferred modification of my invention, Fig. 2 shows a partial end view of the apparatus of Fig. 1. Fig. 3 shows a detail of a contacting device used in the apparatus of Fig. 1 and Fig. 4 represents the nature of the record obtainable with this apparatus.

Referring now to Fig. 1, I have represented an integrating type meter 10 provided with the usual spindle 11. The meter is arranged to drive a recording wheel 13 provided with a number of styli or marking means adjacent its periphery.

In the modification shown, four styli 40 of the prick punch type are used and are equally spaced on the wheel 13 which is rotated by the meter 10 through gearing 36. The meter also drives the usual register train 12 from shaft 42. The rear ends of the styli extend through the wheel 13 and form a plurality of pins extending from the rear side of wheel 13. These pins cooperate with the normally open contact device 41 so as to close the contacts thereof when the pins pass this point as clearly indicated in Fig. 2. Since four equally spaced styli are used, the contacts 41 will be closed for a moment four times for each revolution of wheel 13 and this is done for the purpose of starting a timing motor when the styli are in a predetermined position with respect to the record sheet.

The record sheet 14 is fed from the supply roll 15, over a sector shaped platen 17, across the face of the revolving wheel 13 adjacent the upper periphery to a feeding drum 16 which may also constitute the reroll for the record sheet as illustrated. The platen 17 is arranged to be moved towards the wheel 13 at the end of each time interval so as to cause the adjacent prick punch to prick a hole in the record sheet. The platen is preferably provided with a sector shaped depression 46 into which the prick punches will pass in the punching operation. The platen is carried on the end of a guiding rod 47 which is supported in a frame 48 so as to be moved axially therein without turning on its axis. This rod is provided with an adjustable collar 49 and a spring 50 which is compressed between the collar and stationary part of the frame so as to normally hold the platen away from the wheel 13 in the position illustrated. A weighted lever 31 hinged at 51 is arranged to tap the rear end of rod 47 at the end of each time interval and thereby force the platen towards the wheel 13. An adjustable stop nut 52 is provided to limit this movement.

The timing operation is determined in this case by a synchronous motor 27, which drives a wheel 29 through a worm gear reduction 28—29'. Any other type of timing motor might be used. Wheel 29 carries a pin 30 which is arranged to contact with the lower end of lever 31 and carry the lever to the left a short distance against the action of gravity. At the end of the time interval the pin 30 releases the lever arm 31 and the latter swings back and taps the end of rod 47 as previously mentioned. Lever 31 may be provided with a pawl 25 which cooperates with a ratchet wheel 24 on the drum 16 to advance the record sheet a short distance when the lever is swung to the left by the pin 30. Other provisions may be made for moving the record sheet.

The synchronous motor also drives a contactor segment 53 which controls the circuit of motor 27 and is in parallel with contacts of 41. Brushes 54ª and 54 bear on the contact segment 53 and the shaft thereof respectively and this circuit is closed except when an insulating segment 55 on the periphery of segment 53 comes under brush 54ª which happens just after pin 30 releases lever 31 to perform the recording operation. The motor circuit is thus opened and the motor remains inactive until the meter operated contacts 41 are closed which happen when the next prick punch 40 comes into a predetermined position, for example, adjacent one edge of the record sheet. The rear end of the prick punch then closes contacts 41 and closes the energizing circuit of the motor from a suitable source of current 56. The motor starts up and contacts 41 remain closed a sufficient time for the motor to close its own circuit by rotating segment 55 from under brush 54ª.

In order that the opening of the motor circuit at 54ª—55 may be positive and occur immediately after the lever 31 has been released I prefer to secure wheel 29 and sector 53 rigidly to the shaft and the gear wheel 29' to said shaft by a spring 57 which may be in the shape of a half circle and secured between wheels 29 and 29' as represented in Fig. 3. With this arrangement the wheel 29 and sector 53 lag a little behind gear wheel 29' when the motor is doing the extra work of moving lever 31 against the action of gravity due to a slight winding up of the spring 57. However, as soon as the spring is relieved of the extra torque when lever 31 is released the wheel 29 together with sector 53 will jump ahead a slight distance bringing the insulated portion 55 quickly and positively under the brush 54ª and thereby stopping the motor.

The operation of the instrument may be reviewed as follows: The position of contactor 41 is adjusted so that the contacts will close whenever a stylus moving towards the record sheet passes a predetermined point, for example, the right hand side of the record sheet as viewed in Figs. 2 and 4. This starts motor 27. At the end of the predetermined time interval, for example, 15 minutes, motor 27 will have rotated pin 30 a complete revolution and near the end of that interval pin 30 will come against the lower end of lever 31 and swing it to the left to a position such as is indicated in dotted lines in Fig. 1. This movement will cause pawl 25 to rotate drum 16 a small distance to advance the record sheet. In the meantime the meter will have rotated wheel 13 to bring the particular prick punch across the record sheet a distance proportional to the average meter speed during the interval. At the end of the 15 minute interval pin 30 releases lever 31. Segment 55 moves under brushes 54ª and stops motor 27. Lever 31 swings towards the platen and taps rod 47 causing the platen to quickly press the record sheet against the prick punch to establish a record. Spring 50 is compressed by this movement and the lever 31 having lost its momentum is immediately swung back by spring 50 to a position such as is represented in full lines in Fig. 1. At the same time the platen is brought back away from the prick punch. When lever 31 swings toward the record sheet the pawl 25 rides over a tooth in the ratchet wheel 24 and when it comes back to the normal position it tightens up the record sheet and pulls the same away from the prick punch. The timing motor 27 remains inactive until the next prick punch passes the zero or starting position when the circuit is again energized by the closing of contacts 41, and the operations just described are repeated.

The nature of the record obtained is shown in Fig. 4. It will be evident that if the demand exceeds the normal range of the instrument such that a prick punch moves beyond the record sheet during an interval, the position of the next following prick punch will be recorded in the manner indicated at 60 Fig. 4 so that the record is not lost. However, in this event the motor 27 will remain inactive until a third prick punch crosses the starting point since the contacts at 41 will have been closed and opened again during the preceding time interval. During the small amount of time motor 27 is stopped the demand is not recorded, however, there will be an accurate record of demand at very frequent intervals and if it should happen that contact 41 closes at the same instant the motor opens its own circuit at 54ª—55 the motor will not stop at all and the record will be continuous.

While I have described but a single modification of my invention I do not wish to be limited thereto, since other modifications and arrangement of the parts embodying the same general principles heretofore described will occur to those skilled in the art.

What I claim as new and desire to secure by Letters Patent of the United States, is:—

1. A demand recorder comprising a marker arranged to be moved in a continuous path at a speed proportional to the demand to be recorded, a record sheet arranged to be moved adjacent to and transversely to the path of movement of said marker, means for momentarily establishing contact between said record sheet and marker when adjacent to make a record, and means arranged to be set into operation when said marker passes a definite point in its approach towards said record sheet for operating said contact establishing means after a predetermined interval.

2. A demand recorder comprising a marker arranged to be moved in a continuous path at a speed proportional to the demand to be recorded, a record sheet arranged to be moved adjacent to and transversely to the path of movement of said marker, means for momentarily establishing contact between said marker and record sheet when adjacent to make a record, a timing motor, means for starting said timing motor when said marker passes a definite point in its approach towards the record sheet, and means driven by said motor for operating said contact establishing means after the lapse of a predetermined interval from the time said motor is started.

3. A demand recorder comprising a marker arranged to be moved in a continuous path at a speed proportional to the demand to be recorded, a record sheet arranged to be moved adjacent to and transversely to the path of movement of said marker, means for momentarily establishing contact between said marker and record sheet when adjacent to establish a record, a timing motor, means for starting said timing motor when said marker passes a definite point in its approach towards the record sheet, means driven by said motor for operating said contact establishing means after the laps of a predetermined interval from the time said motor is started, and means operated by said motor for stopping the same at the end of said interval.

4. In combination an integrating type meter and mechanism for recording the demand thereof comprising a stylus arranged to be driven in a circular path by said meter, a record sheet arranged to be moved adjacent to and across a portion of said path, means for momentarily pressing said record sheet against said stylus when adjacent to make a record, a timing motor, means actuated by said meter when said stylus is in a predetermined position for starting said motor, means driven by said motor for actuating said record making means after a predetermined operating interval, and means for stopping said motor simultaneously with the operation of said record making means.

5. A demand recorder comprising a stylus arranged to be moved in a continuous path at a speed proportional to the demand to be recorded, a record sheet arranged to be moved adjacent to and transversely to said path, a constant speed motor, electric contacts arranged to be closed when said stylus is in a predetermined position for starting said motor, means operated by said motor for recording the position of said stylus on said record sheet after a predetermined time interval, and means operated by said motor for stopping the same immediately after said recording operation.

6. A demand recorder comprising a member provided with a plurality of equally spaced styli, said member being arranged to move said styli in a continuous path at a speed proportional to the demand to be recorded, a record sheet arranged to be moved adjacent to and transversely across said path, and means for successively recording the position of each stylus on the adjacent portion of said record sheet a predetermined interval after such stylus has passed a definite point in its approach towards the record sheet.

7. A demand recorder comprising a record sheet, a marker arranged to be moved in a continuous path adjacent to and transversely to said record sheet and normally out of contact therewith such that the marker is caused to successively pass said record sheet in one direction, and means for measuring and recording the distance said marker moves during a predetermined interval each time it passes said record sheet, comprising means for establishing momentary contact between said marker and record sheet at predetermined intervals.

8. A demand recorder comprising a wheel having a plurality of equally spaced styli adjacent its periphery and arranged to be rotated in one direction at a speed proportional to the demand to be recorded, a record sheet arranged to be moved adjacent to and transversely to the path of movement of said styli, means for measuring the distance moved in a predetermined interval by each stylus as it passes the record sheet and means for successively recording said measurements on said record sheet.

9. A demand recorder comprising a marker arranged to be moved in a continuous path at a speed proportional to the demand to be recorded, a record sheet arranged for movement adjacent to and transversely to the path of movement of said marker, a platen for momentarily pressing said record sheet against said marker when they are adjacent, a timing motor, means for starting said timing motor when said marker passes a definite point in its approach towards said record sheet, means actuated by said motor after a predetermined operating interval for actuating said platen whereby a measurement of the distance said marker has moved during the interval is recorded on said record sheet, means operated by said motor for advancing said record sheet before each recording operation and means operated by said motor for stopping the same immediately after each recording operation.

10. A demand recorder comprising a marker arranged to be moved in a continuous path at a speed proportional to the demand to be recorded, a record sheet arranged for movement adjacent to and transversely to the path of movement of said marker, a platen for momentarily establishing contact between said marker and record sheet when they are adjacent, a timing motor, means for starting said timing motor when said marker passes a definite point with respect to said record sheet, means actuated by said motor after a predetermined operating period for actuating said platen whereby a measurement of the distance moved by said marker during the said interval is recorded on said record sheet, means operated by said motor for advancing said record sheet before each recording operation, means operated by said motor for stopping the latter immediately after each recording operation and means set into operation by said motor for tightening up said record sheet immediately after each recording operation.

11. In combination a meter and means for measuring and recording the demand thereof comprising a marker arranged to be driven in a continuous path by said meter, a record sheet arranged to be moved adjacent to and transversely to the path of movement of said marker, an electric timing motor, meter operated contacts for energizing said motor when said marker is in a predetermined position with respect to said record sheet, means actuated by said motor, after a predetermined operating period, for recording on said record sheet a measurement of the distance moved by said marker during the said operating period, and contacts connected in parallel with said meter operated contacts for de-energizing said motor immediately after said recording operation.

In witness whereof, I have hereunto set my hand this 17th day of March, 1924.

HENRY E. WARREN.